(12) United States Patent
Seo et al.

(10) Patent No.: US 12,494,243 B2
(45) Date of Patent: Dec. 9, 2025

(54) MEMORY DEVICE, MEMORY SYSTEM INCLUDING MEMORY DEVICE, AND METHOD OF OPERATING MEMORY DEVICE

(71) Applicant: Samsung Electronics Co., Ltd., Suwon-si (KR)

(72) Inventors: Jeongseok Seo, Suwon-si (KR); Chulhwan Choo, Suwon-si (KR); Doohee Hwang, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 216 days.

(21) Appl. No.: 18/213,826

(22) Filed: Jun. 24, 2023

(65) Prior Publication Data

US 2024/0144988 A1 May 2, 2024

(30) Foreign Application Priority Data

Oct. 27, 2022 (KR) .................. 10-2022-0140053

(51) Int. Cl.
| | |
|---|---|
| *G11C 11/406* | (2006.01) |
| *G06F 3/06* | (2006.01) |
| *G11C 11/408* | (2006.01) |
| *G11C 11/4091* | (2006.01) |
| *G11C 11/4096* | (2006.01) |

(52) U.S. Cl.
CPC .......... *G11C 11/406* (2013.01); *G06F 3/0619* (2013.01); *G06F 3/0658* (2013.01); *G06F 3/0659* (2013.01); *G06F 3/0673* (2013.01); *G11C 11/4087* (2013.01); *G11C 11/4091* (2013.01); *G11C 11/4096* (2013.01)

(58) Field of Classification Search
CPC ............. G11C 11/406; G11C 11/4087; G11C 11/4091; G11C 11/4096; G11C 11/40603; G11C 11/40611; G11C 11/4085; G11C 11/4094; G06F 3/0619; G06F 3/0658; G06F 3/0659; G06F 3/0673
USPC ........................................... 365/222
See application file for complete search history.

(56) References Cited

U.S. PATENT DOCUMENTS

| | | | |
|---|---|---|---|
| 6,167,484 A | 12/2000 | Boyer et al. | |
| 9,589,606 B2 | 3/2017 | Lin et al. | |
| 9,767,883 B2 | 9/2017 | Doo et al. | |
| 9,892,779 B2 | 2/2018 | Kang et al. | |

(Continued)

FOREIGN PATENT DOCUMENTS

| | | |
|---|---|---|
| JP | 07211067 A | 8/1995 |
| JP | 3125733 B2 | 7/1999 |

(Continued)

*Primary Examiner* — Amir Zarabian
(74) *Attorney, Agent, or Firm* — Muir Patent Law, PLLC

(57) ABSTRACT

A method of operating a memory device, the method includes periodically receiving a refresh command from a host, determining whether a target row address is activated during a predetermined period of time, and skipping a refresh operation on a word line corresponding to the target row address when the target row address is activated, and transmitting, to the host, a refresh skip signal corresponding to the word line on which the refresh operation is skipped, or performing, in response to the refresh command, a refresh operation on a word line corresponding to the target row address when the target row address is not activated.

20 Claims, 9 Drawing Sheets

(56) References Cited

U.S. PATENT DOCUMENTS

| | | | |
|---|---|---|---|
| 9,972,377 | B2 | 5/2018 | Oh et al. |
| 9,978,440 | B2 | 5/2018 | Cho |
| 10,090,039 | B2 | 10/2018 | Doo et al. |
| 10,223,311 | B2 | 3/2019 | Doo et al. |
| 10,446,216 | B2 | 10/2019 | Oh et al. |
| 10,600,470 | B2 | 3/2020 | Bang |
| 10,607,683 | B2 | 3/2020 | Shin et al. |
| 10,719,467 | B2 | 7/2020 | Doo et al. |
| 10,811,077 | B2 | 10/2020 | Shin et al. |
| 10,860,222 | B2 | 12/2020 | Shin et al. |
| 11,087,821 | B2 | 8/2021 | Son et al. |
| 11,197,531 | B2 | 12/2021 | Hogan |
| 2009/0027989 | A1 | 1/2009 | Michalak et al. |
| 2011/0161579 | A1 | 6/2011 | Walker |
| 2016/0180917 | A1 | 6/2016 | Chishti et al. |
| 2018/0025769 | A1* | 1/2018 | Lee ............... G11C 11/4093 365/189.05 |
| 2018/0261268 | A1* | 9/2018 | Hyun ............... G11C 8/08 |
| 2021/0158861 | A1* | 5/2021 | Jeong ............... G06F 11/1048 |
| 2021/0343331 | A1 | 11/2021 | Suh et al. |
| 2022/0084564 | A1 | 3/2022 | Choi et al. |
| 2022/0208251 | A1 | 6/2022 | Hong et al. |
| 2023/0290399 | A1* | 9/2023 | Kim ............... G11C 11/40622 |

FOREIGN PATENT DOCUMENTS

| | | |
|---|---|---|
| JP | 2000113667 A | 4/2000 |
| JP | 4561089 B2 | 6/2005 |
| KR | 20140088725 A | 7/2014 |

\* cited by examiner

MEMORY DEVICE, MEMORY SYSTEM INCLUDING MEMORY DEVICE, AND METHOD OF OPERATING MEMORY DEVICE

CROSS-REFERENCE TO RELATED APPLICATION(S)

This application claims benefit of priority to Korean Patent Application No. 10-2022-0140053 filed on Oct. 27, 2022 in the Korean Intellectual Property Office, the disclosure of which is incorporated herein by reference in its entirety.

BACKGROUND

The present disclosure relates to a memory device, a memory system including the same, and a method of operating the same.

In general, a dynamic random access memory (DRAM) performs a refresh operation to maintain stored data. That is, the DRAM may maintain data stored in a cell capacitor through the refresh operation. With the development of process technology such as an increase in a degree of integration, a distance between DRAM cells has gradually been reduced. In addition, due to a reduction in the distance between cells, interference caused by adjacent cells or word lines has been acting as an increasingly important data reliability factor. Even if the above-described interference is concentrated on a specific cell, it is difficult to restrict access to a specific address in a random access memory such as a DRAM. Accordingly, disturbance may occur in a specific cell, and refresh properties of the cell may also be affected.

SUMMARY

An aspect of the present disclosure provides a memory device reducing power consumption, a memory system including the same, and a method of operating the same.

According to an aspect of the present disclosure, there is provided a memory device including a cell array including memory cells connected to word lines and bit lines, a row decoder configured to select, in response to a row address, at least one word line from among the word lines, a column decoder configured to select, in response to a column address, at least one bit line from among the bit lines, a sense amplifier configured to write data to a memory cell connected to the selected at least one bit line or to read data from the memory cell, an input/output circuit configured to read data from the sense amplifier during a read operation or to transmit data transmitted from an external device to the sense amplifier during a write operation, an address register configured to receive an address from the external device, a row address buffer configured to store the row address among the received addresses, a column address buffer configured to store the column address among the received addresses, a command decoder configured to receive a first refresh command from the external device, and a refresh control circuit configured to periodically perform, in response to the first refresh command, a first refresh operation on the cell array. The refresh control circuit may include an active tagging latch connected to each of the word lines and configured to determine whether to skip the first refresh operation. The active tagging latch may be configured to store a value indicating whether a corresponding word line is activated within a predetermined period of time.

According to another aspect of the present disclosure, there is provided a method of operating a memory device, the method including periodically receiving a refresh command from a host, determining whether a target row address is activated during a predetermined period of time, and skipping a refresh operation on a word line corresponding to the target row address when the target row address is activated, and transmitting, to the host, a refresh skip signal corresponding to the word line on which the refresh operation is skipped, or performing, in response to the refresh command, a refresh operation on the word line corresponding to the target row address when the target row address is not activated.

According to another aspect of the present disclosure, there is provided a memory system including a memory device, and a controller configured to control the memory device. The memory device may include a cell array including a plurality of memory cells connected to a plurality of word lines and a plurality of bit lines, and a refresh control circuit configured to perform a refresh operation on the plurality of memory cells of the cell array. The refresh control circuit may include a refresh skip circuit including an active tagging latch and configured to periodically receive a first refresh command and to skip a first refresh operation depending on a value stored in the active tagging latch, and a target row refresh logic configured to perform, in response to a second refresh command, a second refresh operation based on number of accesses to the target row in a predetermined period of time. The value stored in the active tagging latch may indicate whether a corresponding word line is activated within the predetermined period of time.

According to another aspect of the present disclosure, there is provided a memory device including a cell array including memory cells connected to word lines and bit lines, a row decoder configured to select, in response to a row address, at least one word line from among the word lines, a column decoder configured to select, in response to a column address, at least one bit line from among the bit lines, a sense amplifier configured to write data to a memory cell connected to the selected at least one bit line or to read data from the memory cell, an input/output circuit configured to read data from the sense amplifier during a read operation or to transmit data transmitted from a controller to the sense amplifier during a write operation, an address register configured to receive an address from the controller, a row address buffer configured to store the row address among the received addresses, a column address buffer configured to store the column address among the received addresses, a command decoder configured to receive a first refresh command from the controller, a refresh counter configured to count up depending on a first refresh operation for a target row address and to output a counted address, a row active register configured to store a row address activated during a predetermined period of time, a comparator configured to compare the counted address from the refresh counter with a value stored in the row active register and to output the counted address depending on the value of the row active register, and a multiplexer configured to output one of the counted address from the comparator and the row address stored in the row address buffer to the row decoder, depending on the first refresh command.

In a memory device, a memory system including the same, and a method of operating the same according to example embodiments of the present disclosure, a refresh operation may be skipped depending on whether an active operation is performed on a word line, thereby reducing power consumption.

In addition, refresh skip information may be output to a host, such that system performance may be improved using the refresh skip information.

The various and beneficial advantages and effects of the present disclosure are not limited to the above description, and will be more easily understood in the course of describing specific example embodiments of the present disclosure.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
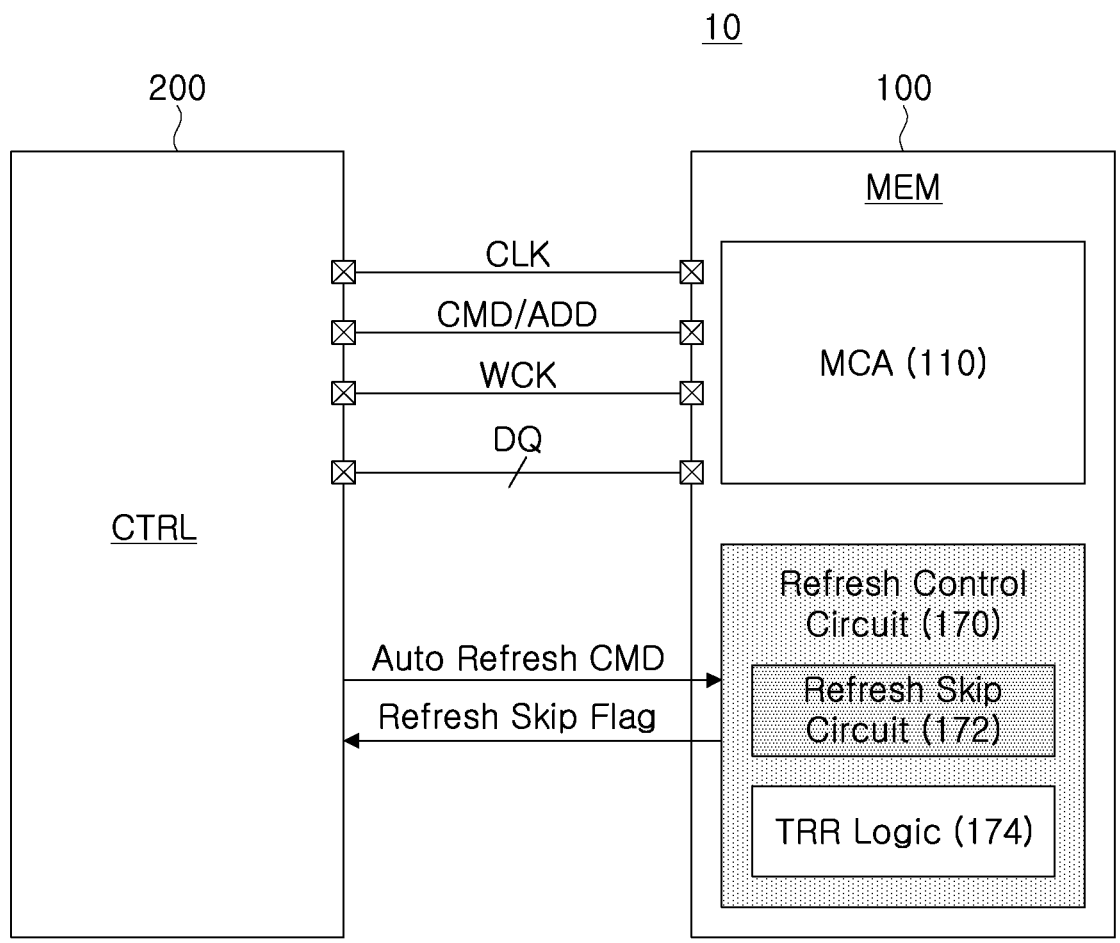
FIG. 1 is a diagram illustrating a memory system according to an example embodiment of the present disclosure.

Hereinafter, example embodiments of the present disclosure will be described clearly and specifically such that a person skilled in the art easily could carry out example embodiments using the drawings.

In general, a dynamic random access memory (DRAM) may perform a refresh operation of periodically recharging a cell capacitor in order to preserve data by compensating for discharge caused by leakage current of a cell capacitor. In Joint Electron Device Engineering Council (JEDEC), a refresh operation may be performed a specified number of times (8K times) during a predetermined period of time (for example, tREFW) such as 32 ms or 64 ms in order to preserve data in a DRAM cell. Accordingly, a host (for example, a CPU) using the DRAM may periodically transmit an auto-refresh command to the DRAM according to a refresh interval time (tREFI) (adjustable depending on a temperature environment), or may enter into a self-refresh mode in which the DRAM performs a refresh operation itself to perform a refresh operation.

Most of system operation time of products such as general mobile devices, personal computers (PCs), and servers may be waiting time. During such waiting time, the DRAM may require a refresh operation, such that current consumed to perform the refresh operation (for example, IDD5/6) may account for a relatively large proportion of current consumed in the total system. Therefore, a reduction in the current for the refresh operation has been constantly required. Recently, charge holding time of the cell capacitor has been reduced due to miniaturization of a process. Accordingly, the number of refresh operations required to be performed in the DRAM has been increasing. In accordance with the trend for a high-density DRAM die, the number of cells connected to one word line has been increased. Accordingly, while a refresh operation is performed once, corresponding current has also been greatly increased.

In a memory device, a memory system including the same, and a method of operating the same according to an example embodiment of the present disclosure, a refresh operation for an active word line may be skipped within a predetermined period of time (for example, tREFW or tREFI). The memory device according to an example embodiment of the present disclosure may include an S-R latch indicating whether an active operation is performed during a refresh window period of time (tRFEW) for each word line, a comparator determining whether the refresh operation is performed depending on a corresponding latch state during the refresh operation, a comparator capable of notifying a host of skipping of the refresh operation, and a signal line.

In the memory device, the memory system including the same, and the method of operating the same according to an example embodiment of the present disclosure, the refresh operation may be skipped for an address on which the active operation is performed at least once during the refresh window period of time (tRFEW), thereby reducing current consumption required for the corresponding operation. In addition, in the memory device, the memory system including the same, and the method of operating the same according to an example embodiment of the present disclosure, the host may recognize skipping of the refresh operation to perform another operation such as a read/write operation without limiting a refresh command execution time.

FIG. 1 is a diagram illustrating a memory system according to an example embodiment of the present disclosure. Referring to FIG. 1, a memory system 10 may include a memory device (MEM) 100 and a controller (CTRL) 200 controlling the memory device 100.

The memory system 10 may be implemented to be included in a personal computer (PC) or a mobile electronic device. The mobile electronic device may be implemented as a laptop computer, mobile phone, smartphone, tablet PC, personal digital assistant (PDA), enterprise digital assistant (EDA), digital still camera, digital video camera, portable multimedia player (PMP), personal navigation device or portable navigation device (PND), handheld game console, mobile internet device (MID), wearable computer, Internet of Things (IoT) device, Internet of Everything (IoE), or a drone.

The memory device 100 may be implemented to store data. In an example embodiment, the memory device 100 may be implemented as a volatile memory device. For example, the volatile memory device may be implemented as random access memory (RAM), dynamic RAM (DRAM), static RAM (SRAM), or low power double data rate (LPDDR) DRAM. In an example embodiment, the memory device 100 may be implemented as anon-volatile memory device. For example, the non-volatile memory device may be implemented electrically erasable programmable read-only memory (EEPROM), flash memory (flash memory), phase change random access memory (PRAM), resistance random access memory (RRAM), nano floating gate memory (NFGM), polymer random access memory (PoRAM), magnetic random access memory (MRAM), or ferroelectric random access memory (FRAM).

Referring back to FIG. 1, the memory device 100 may include a cell array (MCA) 110 and a refresh control circuit 170.

The cell array MCA 110 may include a plurality of memory banks. Each of the plurality of memory banks may include a plurality of memory cells connected to word lines and bit lines. In an example embodiment, each of the memory cells may be implemented as a volatile memory cell or a non-volatile memory cell. Hereinafter, for ease of description, each memory cell will be referred to as a volatile memory cell having an access transistor and a cell capacitor. For example, a gate terminal of an access transistor of a memory cell may be connected to a corresponding word line, and one end thereof may be connected to a bit line.

The refresh control circuit 170 may be implemented to control a refresh operation of the cell array 110. Here, the refresh operation may include an auto-refresh operation (or first refresh operation) and a target row refresh operation (or second refresh operation). The refresh control circuit 170 may include a refresh skip circuit 172 and a target row refresh logic (TRR Logic) 174.

The refresh skip circuit 172 may be implemented to receive the auto-refresh command (or a first refresh command) and to perform a selective refresh operation in response to the auto-refresh command. In an example embodiment, the auto-refresh command may be periodically received from the controller 200. For example, the auto-refresh command may be received from the controller 200 every refresh cycle time (for example, tRFC). In the selective refresh operation, a refresh operation for at least one word line of each of banks of the cell array 110 may be skipped depending on active address information activated within a refresh cycle.

In addition, the refresh skip circuit 172 may output a word line flag to a comparator of the refresh control circuit 170 and the comparator may output a refresh skip flag to the controller 200. Although not shown, the refresh skip flag may include address information on which the refresh operation is skipped in response to the auto-refresh command. In this case, an additional plurality of refresh skip flags may be provided and the additional plurality of refresh skip flags may have the address information. In an example embodiment, the refresh skip flag may be transmitted to the controller 200 by toggling of at least one data pin (for example, DQ pin) or at least one data mask pin (for example, DMI pin).

The target row refresh logic 174 may be implemented to perform the refresh operation on a target row in response to a request (for example, a refresh management RFM command RFM) of an external entity (for example, CTRL 200) or an internal request. The refresh operation on the target row has been filed by SAMSUNG ELECTRONICS CO., LTD., and is disclosed in U.S. Patent Application Publication No. 2022-0208251, U.S. Patent Application Publication No. 2022-0084564, U.S. Pat. Nos. 9,589,606, 9,767,883, 9,892,779, 9,972,377, 9,978,440, 10,090,039, 10,223,311, 10,719,467, 10,446,216, 10,600,470, 10,607,683, 10,811, 077, 10,860,222, 11,087,821, and 11,107,531, the entirety of which is herein incorporated by reference.

Herein, one or more circuits in the refresh control circuit 170 may be commonly shared in the refresh skip circuit 172 and the target row refresh logic 174.

In general, for a read/write operation in the cell array 110, the controller 200 may transmit, to the memory device 100, an active command together with an address. In this case, an active operation may be performed on a word line corresponding to the address, and a cell capacitor connected to the corresponding word line may be charged. The active operation may cause an effect the same as that of the refresh operation. The memory device 100 according to an example embodiment of the present disclosure may skip a refresh operation for the word line on which an active operation is performed during a refresh interval time tREFI.

The memory controller 200 may be implemented to control the memory device 100 to read data stored in the memory device 100 during a read operation or to write data to the memory device 100 during a write operation. The memory controller 200 may provide a command CMD and an address ADD to the memory device 100 in synchronization with a clock CLK, thereby controlling the write operation or the read operation performed on the memory device 100. In addition, data input and output through data lines DQ may be transmitted and received between the memory controller 200 and the memory device 100 in synchronization with a data transfer clock WCK.

In addition, the controller 200 may provide interfacing between the host and the memory device 100. The controller 200 may exchange data and a signal with the memory device 100 through control signal lines /RAS, /CAS, and /WE, address lines ADD, data lines DQ, and a warning signal line.

In a general memory system, a memory device may perform a refresh operation on all banks for a predetermined period of time (for example, tREFW). Conversely, in the memory system 10 according to an example embodiment of the present disclosure, the memory device 100 may selectively perform, based on active address information, a refresh operation. Accordingly, the memory system 10 according to the present disclosure may selectively perform a refresh operation on word lines, thereby reducing power consumption. In addition, in the memory system 10 of the present disclosure, the controller 200 may use a refresh skip flag of the memory device 100 to enable a read/write operation for a memory cell connected to a corresponding word line without waiting for a refresh cycle.

Figure 2:
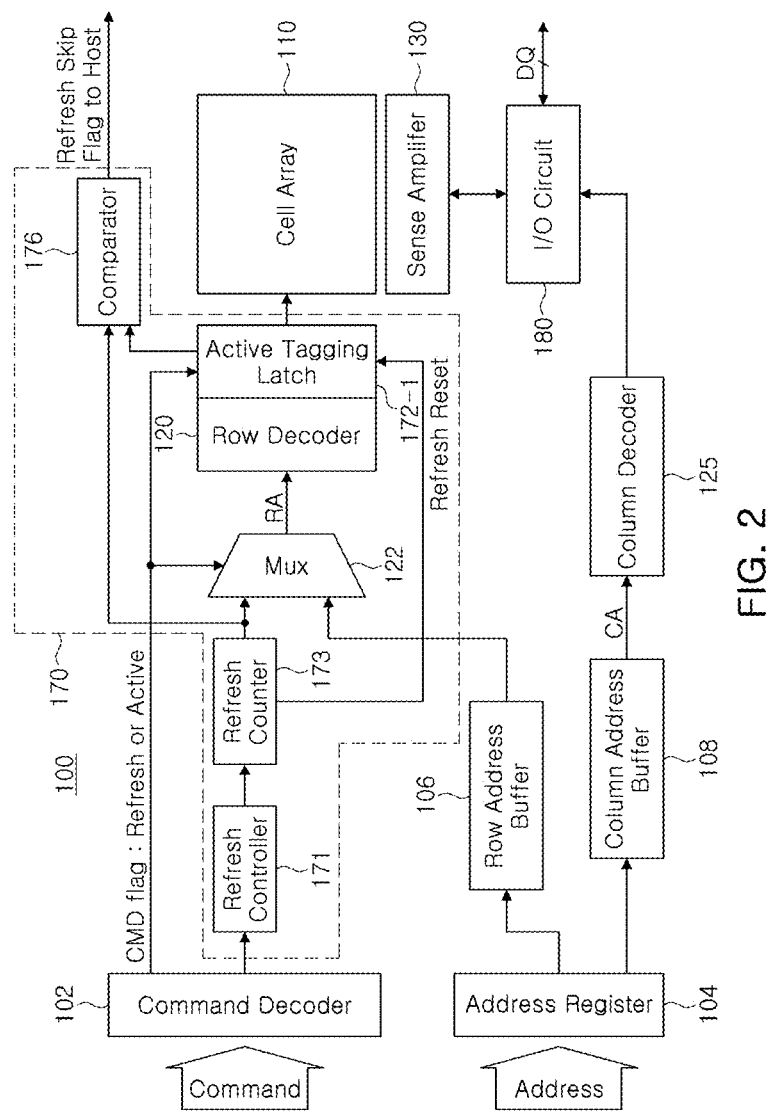
FIG. 2 is a diagram illustrating a memory device according to an example embodiment of the present disclosure.

FIG. 2 is a diagram illustrating the memory device 100 according to an example embodiment of the present disclosure. Referring to FIG. 2, the memory device 100 may include a command decoder 102, an address register 104, a row address buffer 106, a column address buffer 108, a cell array 110, a row decoder 120, a multiplexer 122, a column decoder 125, a sense amplifier circuit 130, a refresh control circuit 170, and an input/output circuit 180.

The command decoder 102 may be implemented to receive control signals from a controller 200 (see FIG. 1), and to decode a command corresponding to the control signals.

The address register 104 may be implemented to receive address signals from the controller 200 and to store the received address signals. The row address buffer 106 may receive a row address from the address register 104 and store the row address. The column address buffer 108 may receive a column address from the address register 104 and store the column address.

The cell array 110 may include a plurality of bank arrays. Each of the bank arrays may include a plurality of memory cells formed at points at which a plurality of word lines and a plurality of bit lines intersect each other. In an example embodiment, each of the memory cells may be implemented to include a selection transistor and a capacitor.

The row decoder 120 may be implemented to receive a row address RA, to decode the row address RA, and to activate a word line corresponding to the row address RA. For example, the activated row decoder may select a word line corresponding to the row address RA and apply a word line voltage to the selected word line. Here, the row address RA may be output from the multiplexer 122.

The multiplexer 122 may output, as the row address RA, one of a first row address output from a refresh counter 173 and a second row address output from the row address buffer 106, in response to a command flag.

The column decoder 125 may be implemented to receive a column address CA, to select bit lines corresponding to the column address CA, and to connect sense amplifiers corresponding to the selected bit lines. Here, the column address CA may be output from the column address buffer 108.

The sense amplifier circuit 130 may include a plurality of sense amplifiers connected to a plurality of bit lines. Each of the plurality of sense amplifiers may be implemented to sense data corresponding to a bit line. For example, each of the sense amplifiers may be connected to a bit line and a complementary bit line. Each of the plurality of sense amplifiers may be implemented to write data to a memory cell connected to the selected bit line or to sense stored data from the memory cell connected to the selected bit line. In addition, each of the plurality of sense amplifiers may be implemented to rewrite data stored in the memory cell in a refresh operation.

The refresh control circuit 170 may be implemented to periodically perform a refresh operation (first refresh operation) on the cell array 110 in response to an auto-refresh command (first refresh command). The refresh control circuit 170 may include a refresh controller 171, the refresh skip circuit 172, the refresh counter 173 and a comparator 176.

The refresh controller 171 may be implemented to receive an auto-refresh command (first refresh command) from the command decoder 102, and to perform, in response to the auto-refresh command, a refresh operation on word lines in a predetermined order.

The refresh skip circuit 172 may include an active tagging latch for each word line. Each active tagging latch may store whether an active command is performed. In general, when the active command is received from the controller 200 (see FIG. 1), an active operation may be performed through the row address buffer 106 and the row decoder 120. In this case, a corresponding word line may be activated.

Thereafter, the refresh skip circuit 172 may skip the refresh operation through comparison with whether a previous active operation is performed when the active operation is performed on the corresponding word line due to a refresh command. The active operation may need to be performed at least once on the corresponding word line during the refresh window period tREFW. Thus, an active operation history may be reset through a refresh reset signal when the refresh window period tREFW elapses.

The refresh counter 173 may be implemented to output a count-up signal while moving a row address on which a refresh operation is to be performed in response to an internal or external timer by the refresh controller 171.

During a refresh command operation, the comparator 176 may compare a word line flag from the active tagging latch with an output signal of the refresh counter 173 to determine whether a corresponding refresh command operation is skipped or performed, and may transmit a refresh skip flag corresponding to a result of the comparison to the controller 200 (see FIG. 1). The memory device 100 may transmit the refresh skip flag through a DQ pin or a DMI pin unused during a period of refresh operation.

Although not shown, while the comparator 176 is compared, the output signal of the refresh counter 173 may be presented as "1" or "0" depending on the counted address corresponding to the word line flag being existed such that the comparator 176 may compare a value of the output signal from the refresh counter 173 and the word line flag.

When the controller 200 receives the refresh skip flag from the memory device 100 and a refresh operation according to the refresh command is skipped, the controller 200 may immediately transmit a next command to the memory device 100 without waiting for a row refresh cycle time tRFC.

The input/output circuit 180 may be implemented to read data from a corresponding sense amplifier of the sense amplification circuit 130 during a read operation or to transmit data transmitted from an external device to a sense amplifier during a write operation.

The memory device 100 according to an example embodiment of the present disclosure may include the refresh skip circuit 172 selectively performing a refresh operation/refresh skip operation using the active tagging latch, thereby reducing power consumption required for the refresh operation.

Figure 3:
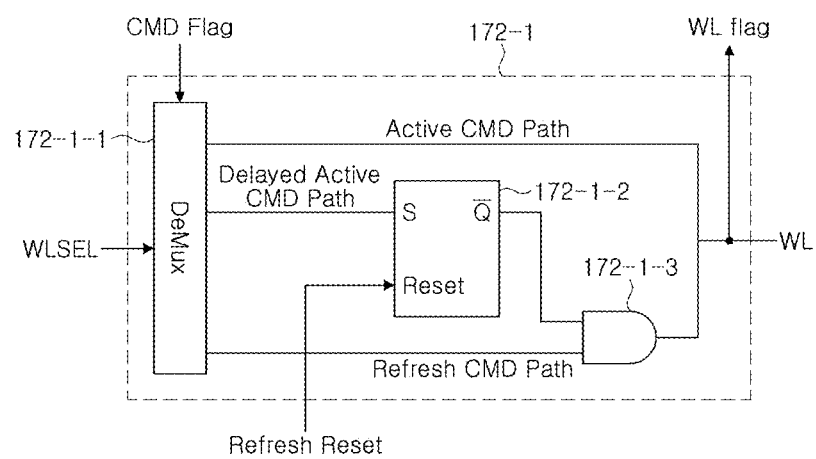
FIG. 3 is a diagram illustrating an active tagging latch of a refresh skip circuit according to an example embodiment of the present disclosure.

FIG. 3 is a diagram illustrating an active tagging latch of the refresh skip circuit 172 according to an example embodiment of the present disclosure.

Referring to FIG. 3, an active tagging latch 172-1 may include a demultiplexer 172-1-1, an SR latch (or flip flop) 172-1-2, and an AND gate 172-1-3. The demultiplexer 172-1-1 may distinguish whether a word line selection signal WLSEL input to a corresponding word line WL based on a CMD flag is caused by a refresh command or an active command. For example, the CMD flag may have "00" if the word line selection signal WLSEL is output by the active command, and the CMD flag may have "11" when the word line selection signal WLSEL is output by the refresh command. For example, the word line selection signal WLSEL may be output from the row decoder 120 based on the row address RA.

First, when the word line WL is activated due to the active command, the word line WL may be activated through an active command path by the row decoder 120 and the active tagging latch 172-1. The demultiplexer 172-1-1 may output "1" to a set of the SR latch 172-1-2 through a delayed active command path to allow $\overline{Q}$ to become "0" based on the CMD flag. In this case, the CMD flag may have "01" and the CMD flag having "01" may input to the demultiplexer 172-1-1 after an operation corresponding to the active command is performed. Subsequently, when a refresh command path is activated due to the refresh command, the word line selection signal WLSEL may be output through the refresh command path based on the CMD flag (e.g., "11"). The word line selection signal WLSEL of the refresh command path and a $\overline{Q}$ signal of the SR latch 172-1-2 may be compared with each other by the AND gate 172-1-3. When $\overline{Q}$ is "0", the word line WL may not be activated. Conversely, when $\overline{Q}$ is "1", the word line WL may be activated.

In addition, an execution result of the active tagging latch 172-1 may be output as a WL flag in parallel, such that the WL flag and the refresh command may be compared with each other, and whether the refresh command is skipped may be transmitted to a host, depending on a result of the comparison. Herein, the host may exchange data and signals with the memory device through the controller thus, for convenience of description, the terms of the host and the controller may be used interchangeably. For example, it may be described that either the host may transmit/receive command/data to/from the memory device or the controller may transmit/receive command/data to/from the memory device.

In this case, an active operation may need to be performed at least once on the word line WL during a refresh window period tREFW. Accordingly, when the refresh window period tREFW elapses, the SR latch 172-1-2 may be reset in response to a refresh reset signal from the refresh counter 173. Accordingly, the signal of $\overline{Q}$ of the SR latch 172-1-2 may be reset to "1."

Figure 4A:
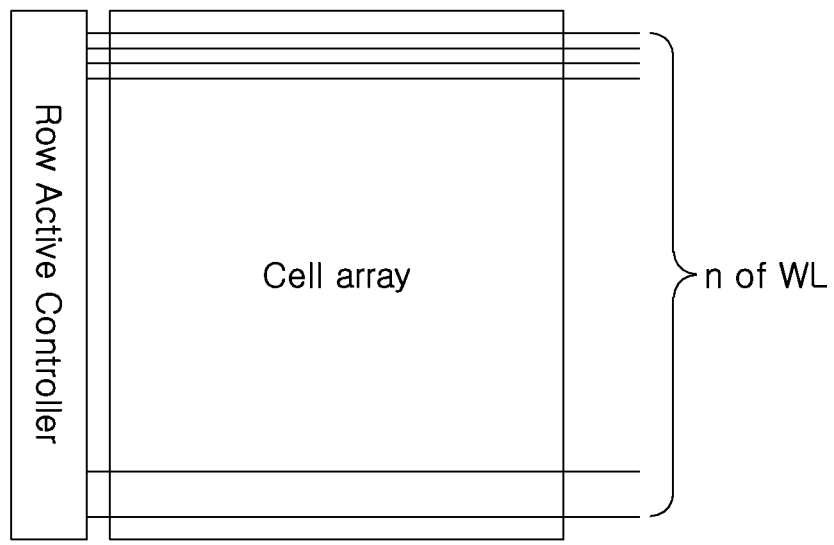
FIGS. 4A and 4B are diagrams illustrating the number of word lines and active tagging latches according to an example embodiment of the present disclosure.
Figure 4B:
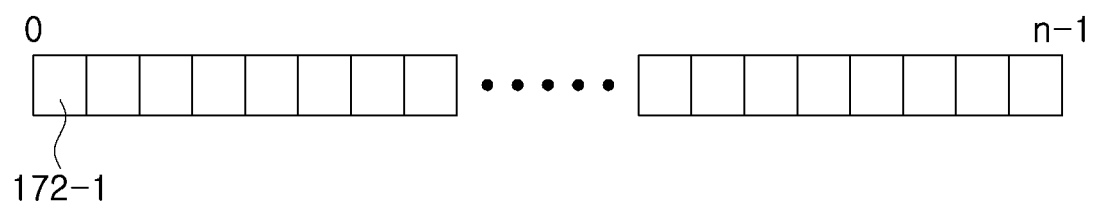

FIGS. 4A and 4B are diagrams illustrating the number of word lines and active tagging latches according to an example embodiment of the present disclosure.

Referring to FIGS. 4A and 4B, the number of active tagging latches 172-1 of the refresh skip circuit 172 may correspond to the number of word lines of each bank. That is, in a memory device having n word lines, an n-bit active tagging latch may be needed.

The memory device 100 according to an example embodiment of the present disclosure may also reset the active tagging latch 172-1 when the refresh counter 173 is reset after the refresh window period tREFW elapses, thereby allowing a refresh operation or active operation to be performed at least once on the corresponding word line WL. Thus, data loss caused by the effect of discharging a memory cell may be prevented.

When a result of comparison of comparator is identified, and accordingly the refresh operation is skipped, an auto-refresh command transmitted from a host may notified to the host by toggling of a DQ pin or DMI pin unused during a period in which the auto-refresh operation is performed, such that the host may perform a next operation without a timing constraint (for example, tRFC is 60 to 488 ns thus tRFC time increases as DRAM capacity increases) according to the refresh operation. As a result, operating efficiency of a memory device may be increased.

Figure 5:
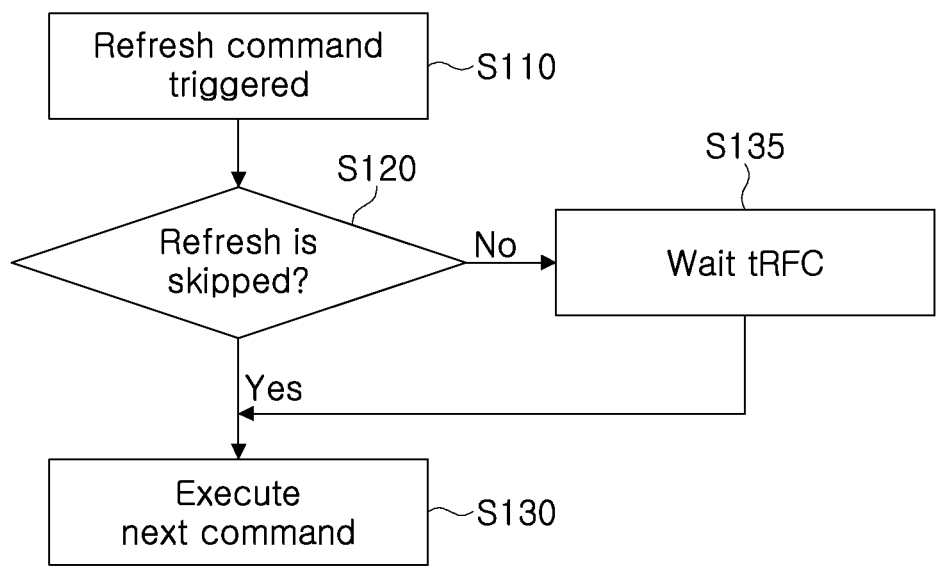
FIG. 5 is a flowchart illustrating a method of operating a memory device according to an example embodiment of the present disclosure.

FIG. 5 is a flowchart illustrating a method of operating a memory device according to an example embodiment of the present disclosure.

Referring to FIGS. 1 to 5, an operation of the memory device 100 may be performed as follows. The memory device 100 may include a 1-bit flip flop array storing whether an active operation of the cell array 110 is performed on each word line. The flip flop array may include an active tagging latch for each word line. The active tagging latch may store whether an active command of a corresponding word line is executed. The memory device 100 may trigger a refresh command (S110). When the active operation is performed again on the corresponding word line, the memory device 100 may identify an active command (CMD flag), and may determine whether to skip a refresh operation through a comparison with a latch toggled (e.g., "0" transition) when a previous active operation is performed (S120). In the memory device 100, the active operation may need to be performed at least once on the corresponding word line during the refresh window period tREFW, such that the active operation history may be reset through a refresh reset signal after the refresh window period tREFW elapses.

Whether the refresh operation is skipped may be determined by comparing a WL flag with a signal output from a refresh counter. When the refresh operation is skipped, refresh skip information on a word line may be transmitted to the host. In the case of the word line on which the refresh operation is skipped in such a manner, the host may immediately execute a next command in the memory device 100 without waiting for a refresh cycle time tRFC (S130). Conversely, when the refresh operation is not skipped, the host may wait for the refresh cycle time tRFC (S135).

In an example embodiment, a value indicating whether a word line corresponding to a target address (i.e., a target row address) is activated within the refresh window period tREFW may be stored in the active tagging latch. In an example embodiment, the active tagging latch may be reset every refresh window period tREFW. In an example embodiment, a read or write command for at least one memory cell connected to the skipped word line may be transmitted from the host within the refresh window period tREFW. In other example embodiments, a read or write command for at least one memory cell in the cell array 110 may be transmitted from the host within the refresh window period tREFW. In an example embodiment, a row address activated in response to an active command requested from the host may be stored in a row active register (shown in FIG. 6).

When performing a self/auto-refresh operation, the memory device 100 according to an example embodiment of the present disclosure may observe a cell voltage change of a target address in the cell array 110 to identify whether the refresh operation is performed or skipped. In addition, when the auto-refresh operation is performed, the memory device 100 according to an example embodiment of the present disclosure may transmit feedback on the refresh operation to the host through a data mask inversion (DMI) pin or a DQ pin during the refresh cycle time tRFC or the refresh interval time tREFI.

In the present disclosure, it may not be necessary to store information on whether an active command is executed for each word line.

Figure 6:
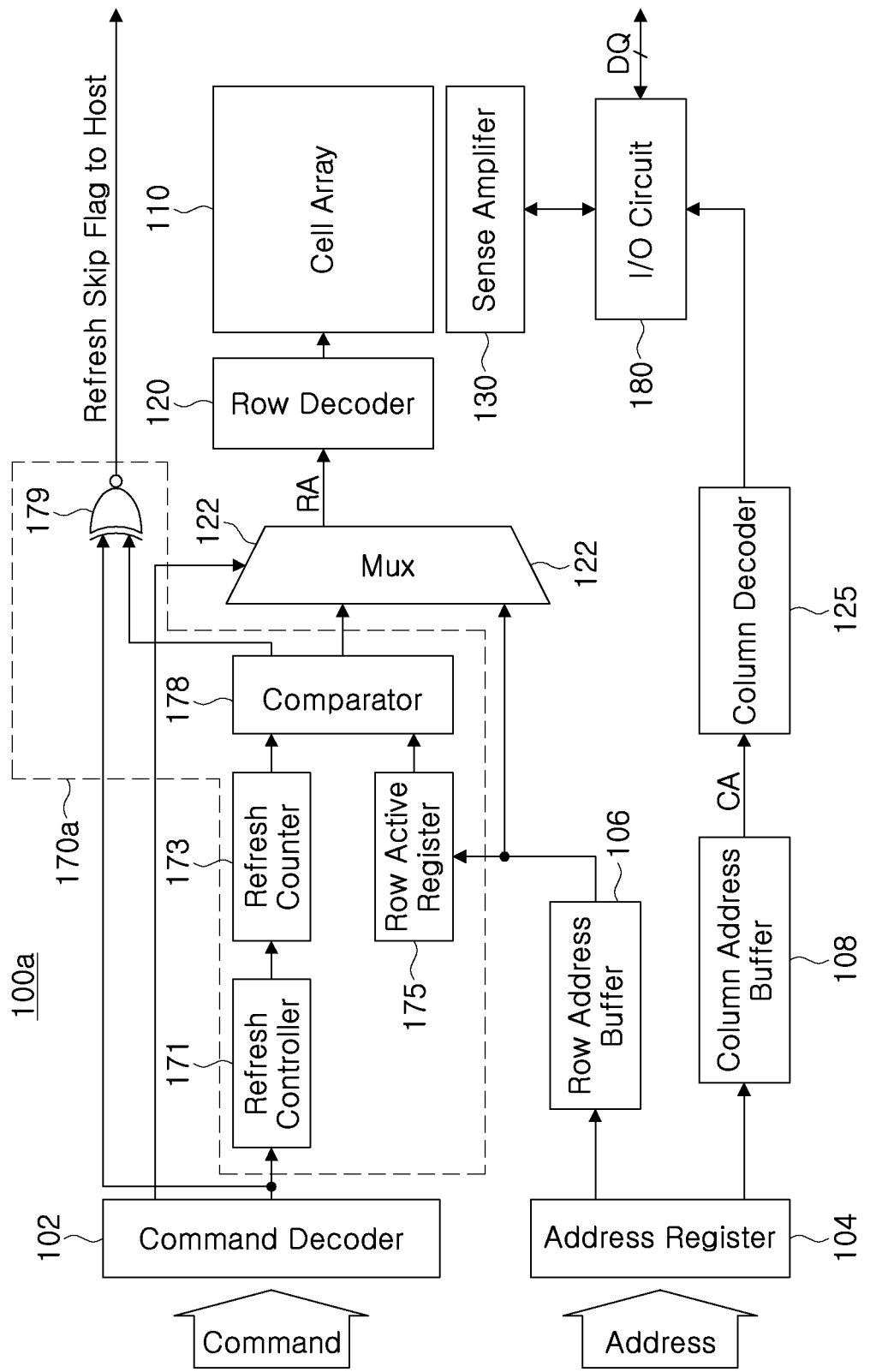
FIG. 6 is a diagram illustrating a memory device according to another example embodiment of the present disclosure.

FIG. 6 is a diagram illustrating a memory device according to another example embodiment of the present disclosure. Referring to FIG. 6, a memory device 100a may include a command decoder 102, an address register 104, a row address buffer 106, a column address buffer 108, a cell array 110, a row decoder 120, a multiplexer 122, a column decoder 125, a sense amplifier circuit 130, a refresh control circuit 170a, and an input/output circuit 180.

As illustrated in FIG. 6, when compared with the refresh control circuit 170 illustrated in FIG. 2, the refresh control circuit 170a may include a row active register 175, a comparator 178, and an exclusive NOR (XNOR) gate 179 in order to replace the refresh skip circuit 172 having the active tagging latch 172-1 for each word line, and the comparator 176.

The refresh counter 173 may generate a counted address in response to a refresh command and perform a function of transmitting a timer and +1 tick. The row decoder 120 may perform a refresh operation while an indicator of a word line to be refreshed receives such a tick and shifts the word line to be refreshed.

The row active register 175 may store a row address on which an active operation is performed in response to an active command requested from the host. For example, the row active register 175 may include the same number of registers as the number of word lines.

The comparator 178 may compare a row address stored in the row active register 175 with an output signal of the refresh counter 173 to determine whether a corresponding refresh command operation is skipped or performed, and may transmit a first output signal of a result of the comparison to the XNOR gate 179. For example, the comparator 178 may output "1" as the first output signal when the row address corresponding to the refresh command is being existed in the row active register 175. In contrast, the comparator 178 may output "0" as the first output signal when the row address corresponding to the refresh command is not being existed in the row active register 175.

Further, the comparator 178 may output to the multiplexer 122 the counted address received from the refresh counter 173 as a second output signal when a row address corresponding to the refresh command is not stored in the row active register 175. The multiplexer 122 may output one of the counted address from the refresh counter 173 or a row address from the row address buffer 106.

The XNOR gate 179 may compare the first output signal from the comparator 178 with a refresh command received at the refresh controller 171 and output a refresh skip flag to the host (or the controller 200 (see FIG. 1)). For example, the XNOR gate 179 may output "1" as the refresh skip flag based on performing an XNOR operation on the first output signal from the comparator 178 having "1" and the refresh command from the command decoder 102.

When the host transmits a refresh command to the memory device 100a, the memory device 100a may compare the row address stored in the row active register 175 with a row address on which a current refresh operation is to be performed, and may skip a series of operations such as an active operation and the like for refresh in an actual cell, when the row address on which the refresh operation is to be performed is the row address already activated within the refresh window period tREFW.

In addition, the memory device 100a may notify the host that the refresh command is skipped by transmitting the refresh skip flag, and the host may perform other operations such as a read/write operation pending due to the refresh operation.

According to an example, the memory device 100a may prevent deterioration of bandwidth efficiency, refresh current, and a row hammer attack intensively accessing a specific word line due to the refresh operation herein disclosed.

During the read/write operation, the memory device 100a may store row addresses corresponding to word lines on which the active operation is performed in the same number of register sets as the number of word lines.

When the refresh command transmitted from the host is transmitted, the memory device 100a may compare a row address determined by the refresh counter 173 with a row address of a register set. When the row address determined by the refresh counter 173 is a row address on which the active operation is previously performed, the memory device 100a may skip the refresh operation.

In addition, the memory device 100a may transmit a refresh skip signal to the host after the refresh operation is skipped. The host may receive the refresh skip signal (i.e., the refresh skip flag), and may immediately execute a next command suspending due to auto-refresh.

The technology of the present disclosure may operate in conjunction with row hammer prevention technology.

Figure 7:
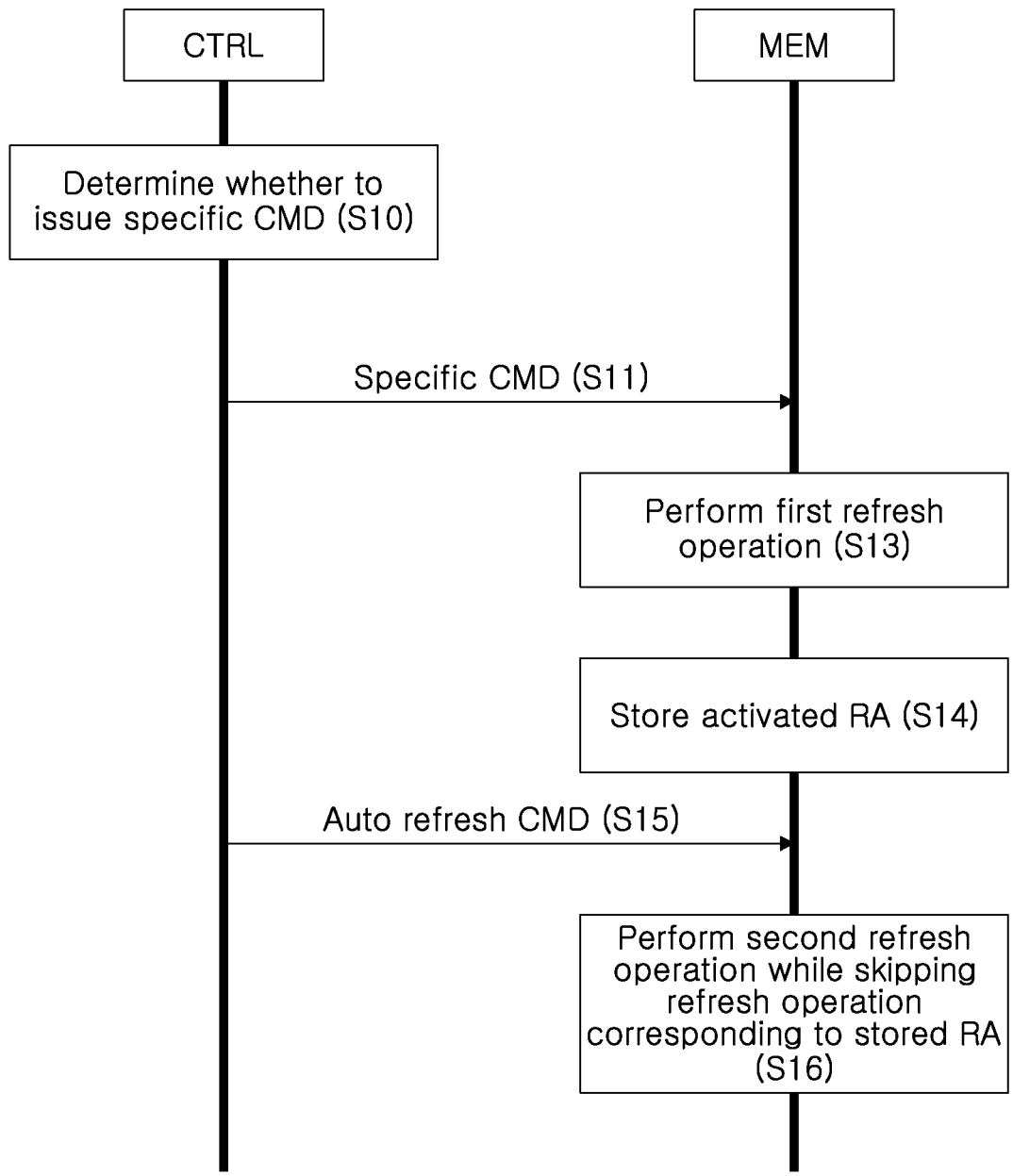
FIG. 7 is a ladder diagram illustrating a refresh operation of a memory system according to an example embodiment of the present disclosure.

FIG. 7 is a ladder diagram illustrating a refresh operation of a memory system according to an example embodiment of the present disclosure.

Referring to FIG. 7, the memory system may perform a refresh operation as follows. A controller CRTL (e.g., the controller 200 in FIG. 1) may determine whether to issue a special command based on environment information of a memory device MEM (S10). Here, the environment information may include access count information or row hammer attack detection information received from the memory device MEM. The access count may be determined by calculating number of accesses to a particular word line during a predetermined period of time. The memory device MEM may receive a special command (for example, a refresh management RFM command) from the controller CRTL (S11). The memory device MEM may perform, in response to the special command, a target row refresh operation based on access count information (S13). The memory device MEM may store a row address on which the refresh operation is performed (S14). Thereafter, the memory device MEM may receive an auto-refresh command from the controller CRTL (S15). The memory device MEM may perform an auto-refresh operation while skipping a refresh operation corresponding to the stored row address (S16).

The memory device of the present disclosure may be applicable to a computing device.

Figure 8:
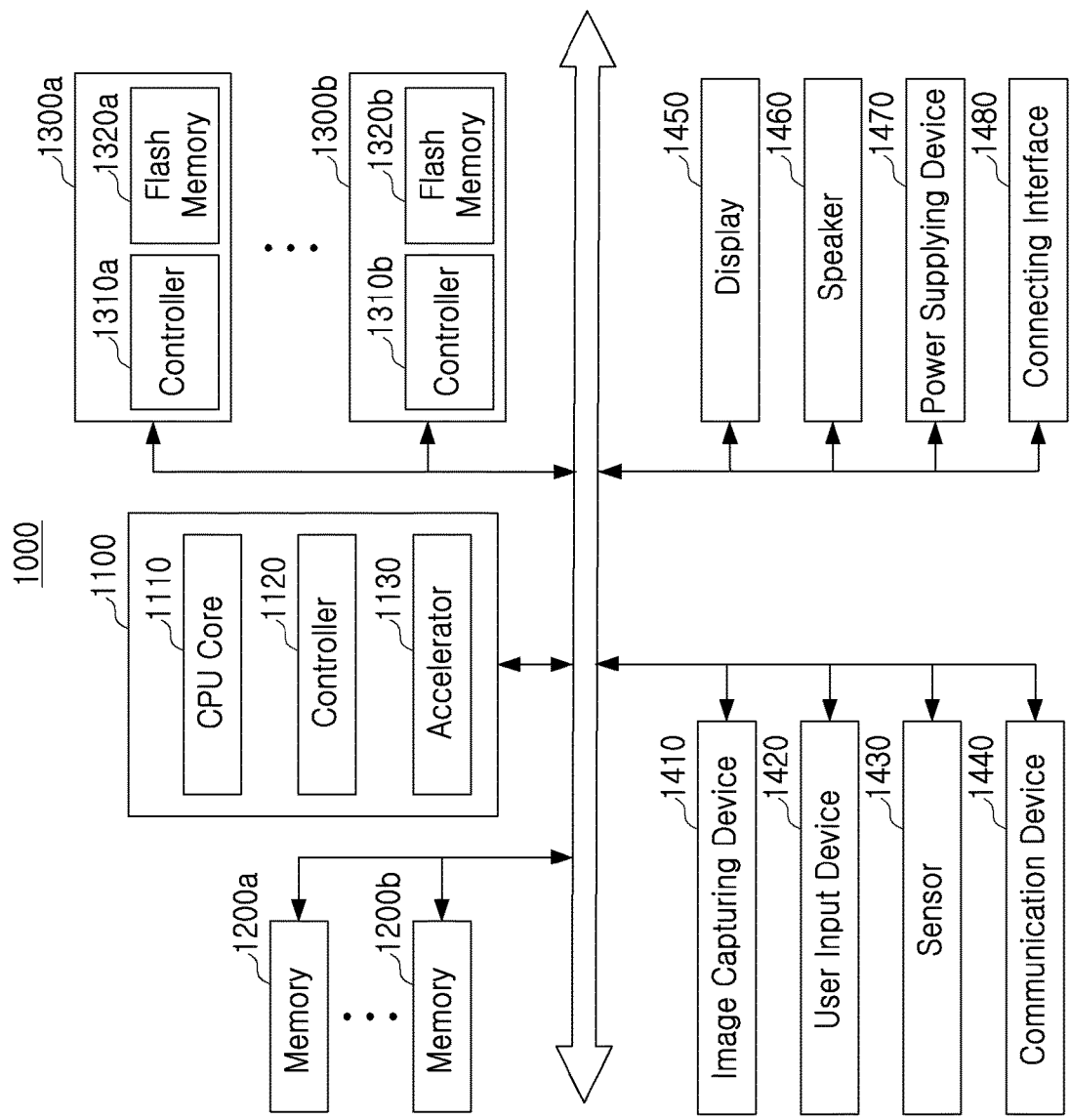
FIG. 8 is a diagram illustrating a computing system according to an example embodiment of the present disclosure.

FIG. 8 is a diagram illustrating a computing system according to an example embodiment of the present disclosure. Referring to FIG. 8, a computing system 1000 may include a main processor 1100, memories 1200a and 1200b, and storage devices 1300a and 1300b, and may further include one or more of an image capturing device 1410, a user input device 1420, a sensor 1430, a communication device 1440, a display 1450, a speaker 1460, a power supply device 1470, and a connection interface 1480.

The main processor 1100 may control an overall operation of the computing system 1000, more specifically, operations of other components included in the computing system 1000. The main processor 1100 may be implemented as a general processor, a dedicated processor, or an application processor.

The main processor 1100 may include one or more CPU cores 1110. In addition, the main processor 1100 may further include a controller 1120 for controlling the memories 1200a and 1200b or the storage devices 1300a and 1300b. The controller 1120 may employ the controller 200 in FIG. 1 and the controller CTRL in FIG. 7. In an example embodiment, the main processor 1100 may further include an accelerator block 1130, a dedicated circuit for high-speed data operation such as artificial intelligence (AI) data operation or the like. The accelerator block 1130 may include a graphics processing unit (GPU), a neural processing unit (NPU), or a data processing unit (DPU). The accelerator 1130 may be implemented as a chip physically independent from the other components of the main processor 1100.

The memories 1200a and 1200b may be used as main memory devices of the computing system 1000. The memories 1200a and 1200b may include a volatile memory such as SRAM or DRAM, or may include a nonvolatile memory such as a flash memory, PRAM or RRAM. The memories 1200a and 1200b may be implemented in the same package as that of the main processor 1100. In particular, the memories 1200a and 1200b may selectively perform a refresh operation in response to an auto-refresh command as described with reference to FIGS. 1 to 7.

The storage devices 1300a and 1300b may be implemented as non-volatile storage devices storing data regardless of whether power is supplied. The storage devices 1300a and 1300b may have a relatively large storage capacity, as compared to those of the memories 1200a and 1200b. The storage devices 1300a and 1300b may include storage controllers 1310a and 1310b and non-volatile memories (NVM) 1320a and 1320b for storing data under control of the storage controllers 1310a and 1310b. Each of the storage controllers 1310*a* and 1310*b* may employ the controller 200 in FIG. 1 and the controller CTRL in FIG. 7. The non-volatile memories 1320*a* and 1320*b* may include a vertical NAND (V-NAND) flash memory having a two-dimensional (2D) structure or a three-dimensional (3D) structure, or may include another type of non-volatile memory such as PRAM or RRAM.

The storage devices 1300*a* and 1300*b* may be included in the computing system 1000 in a state of being physically separated from the main processor 1100. In addition, the storage devices 1300*a* and 1300*b* may be implemented in the same package as that of the main processor 1100. In addition, the storage devices 1300*a* and 1300*b* may have the same form as that of a solid state device (SSD) or a memory card, and thus may be detachably connected to the other components of the computing system 1000 through an interface such as a connection interface 1480 to be described below. The storage devices 1300*a* and 1300*b* may be devices to which standard protocols such as universal flash storage (UFS), embedded multi-media card (eMMC), or non-volatile memory express (NVMe) are applied, but the present disclosure is not limited thereto.

The image capturing device 1410 may capture a still image or film a video. The image capturing device 1410 may be implemented as a camera, a camcorder, or a webcam. The user input device 1420 may receive various types of data input from a user of the computing system 1000, and may be implemented as a touch pad, a keypad, a keyboard, a mouse or a microphone. The sensor 1430 may sense various types of physical quantities obtained from an external entity of the computing system 1000, and may convert the sensed physical quantities into electrical signals. The sensor 1430 may be implemented as a temperature sensor, a pressure sensor, an illuminance sensor, a position sensor, an acceleration sensor, a biosensor, or a gyroscope sensor.

The communication device 1440 may transmit and receive wired/wireless signals to and from external devices of the computing system 1000 according to various communication protocols. The communication device 1440 may include an antenna, a transceiver, or a modem (MODEM). The display 1450 and the speaker 1460 may function as output devices respectively outputting visual information and auditory information to the user of the computing system 1000. The power supply device 1470 may appropriately convert power supplied from a battery embedded in the computing system 1000 or an external power source, and may supply power to components of the computing system 1000.

The connection interface 1480 may provide connection between the computing system 1000 and an external device connected to the computing system 1000 to exchange data with the computing system 1000. The connection interface 1480 may be implemented in various interface manners such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), eMMC, UFS, embedded universal flash storage (eUFS), and compact flash (CF) card interface.

Figure 9:
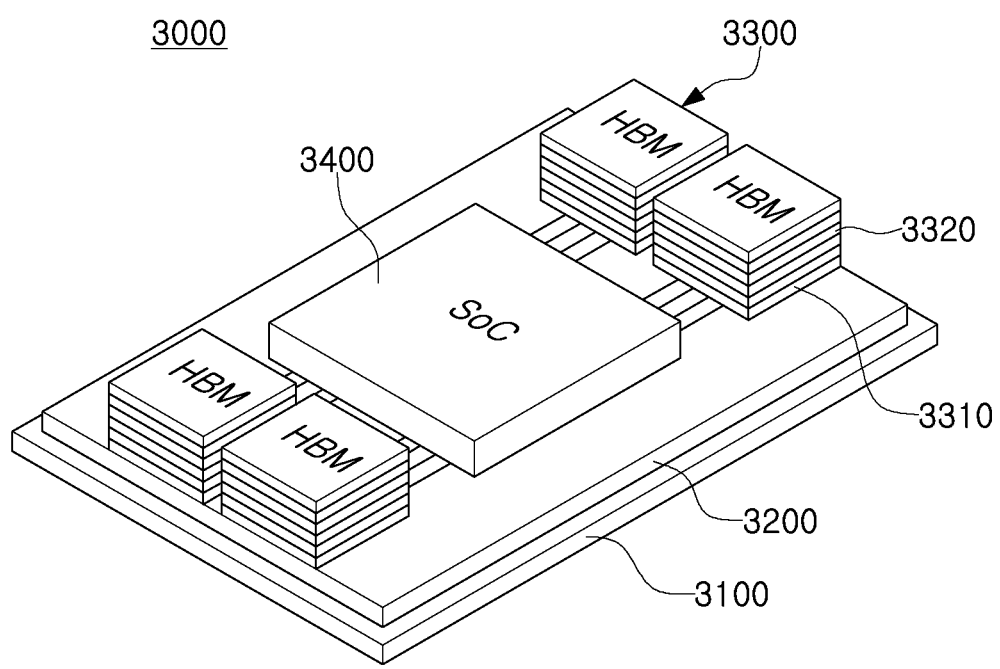
FIG. 9 is a diagram illustrating a semiconductor package including a stack of semiconductor chips according to an example embodiment of the present disclosure.

FIG. 9 is a diagram illustrating a semiconductor package including a stacked semiconductor chip according to an example embodiment of the present disclosure. Referring to FIG. 9, a semiconductor package 3000 may be a memory module including one or more stacked semiconductor chips 3300 mounted on a package substrate 3100 such as a printed circuit board, and a system-on-chip (SoC) 3400. An interposer 3200 may be selectively further provided on the package substrate 3100. The stacked semiconductor chip 3300 may have a chip-on-chip (CoC) structure.

The stacked semiconductor chip 3300 may include one or more memory chips 3320 stacked on a buffer chip 3310 such as a logic chip. The memory chip 3320 may employ the memory device 100 in FIG. 1 and the memory device MEM in FIG. 7. The buffer chip 3310 or the SoC 3400 may employ the controller 200 in FIG. 1 and the controller CTRL in FIG. 7. The semiconductor package 3000 may perform the selective refresh operation, as described with reference to FIGS. 1 to 7. For example, the memory chip 3320 may perform the selective refresh operation, as described with reference to FIGS. 1 to 7.

The buffer chip 3310 and at least one memory chip 3320 may be connected to each other by a through-silicon via (TSV). The buffer chip 3320 may perform a training operation on the memory chip 3320. The stacked semiconductor chip 3300 may be, for example, a high bandwidth memory (HBM) having a memory bandwidth of 500 GB/sec to 1 TB/sec, or higher.

A memory system according to an example embodiment of the present disclosure may include a semiconductor memory device and a controller performing a selective refresh operation. According to the present disclosure, the need for a refresh operation on a memory may be determined to skip a refresh operation on a cell when the refresh operation occurs. Partial array refresh control (PARC) disclosed in JEDEC may divide all cells of one DRAM chip into units of banks. When only some of the banks (divided into 4, 8, 16, and the like) have data, the refresh operation may be skipped and may not be performed on corresponding banks when a SoC (CPU) transmits an auto-refresh command. There are two types of refresh operations such as an auto-refresh operation and a self-refresh operation. The self-refresh operation may be partial array self-refresh (PASR) technology in JEDEC. Similarly, the refresh operation may be skipped on a bank unused when the auto-refresh command is transmitted from the SoC. In the present disclosure, when a read/write operation performed on a word line (WL), the refresh operation may be skipped on the corresponding word line WL, such that a range in which the refresh operation is skippable (one bank vs one WL) may be different from a factor to be skipped (a range specified by analyzing an address using data in the SoC vs a read/write operation).

In general refresh skip technology, a register representing a row of a memory cell may be installed. Thereafter, when an access to a memory cell row occurs, an access address may be decoded to turn on a corresponding register bit. Thereafter, a refresh operation is necessary for a corresponding row, the corresponding register bit may be identified, and then the refresh operation may be skipped. In the present disclosure, there may be provided a flip flop capable of storing 1 bit for each WL line, and thus the refresh operation may be skipped depending on a state of the corresponding flip flop.

While example embodiments have been shown and described above, it will be apparent to those skilled in the art that modifications and variations could be made without departing from the scope of the present disclosure as defined by the appended claims.

What is claimed is:

1. A memory device comprising:
   a cell array including memory cells connected to word lines and bit lines;

a row decoder configured to select at least one word line from among the word lines in response to a row address;

a column decoder configured to select at least one bit line from among the bit lines in response to a column address;

a sense amplifier configured to write data to a memory cell connected to the selected at least one bit line or to read data from the memory cell;

an input/output circuit configured to read data from the sense amplifier during a read operation or to transmit data transmitted from an external device to the sense amplifier during a write operation;

an address register configured to receive an address from the external device;

a row address buffer configured to store the row address among the received addresses;

a column address buffer configured to store the column address among the received addresses;

a command decoder configured to receive a first refresh command from the external device; and a refresh control circuit configured to periodically perform a first refresh operation on the cell array in response to the first refresh command, wherein the refresh control circuit includes an active tagging latch connected to each of the word lines and configured to activate a corresponding word line of the word lines and determine whether to skip the first refresh operation, wherein the active tagging latch is configured to store a value indicating whether the corresponding word line is activated within a predetermined period of time, and wherein the refresh control circuit is configured to skip the first refresh operation for the corresponding word line that is activated within the predetermined period of time.

2. The memory device of claim 1, wherein the refresh control circuit is configured to output, to the external device, a refresh skip flag for a word line on which the first refresh operation is skipped.

3. The memory device of claim 2, wherein the refresh control circuit is configured to output the refresh skip flag to the external device by toggling at least one data pin or at least one data mask pin of the memory device.

4. The memory device of claim 1, wherein the refresh control circuit further includes:
a refresh controller configured to receive the first refresh command from the command decoder and to perform the first refresh operation on the word lines in response to the first refresh command; and
a refresh counter configured to count up a count of a row address corresponding to a word line on which the first refresh operation is performed.

5. The memory device of claim 4, wherein the refresh control circuit further includes:
a comparator configured to compare an output value of the refresh counter with a value stored in the active tagging latch and to output a refresh skip flag for a corresponding word line.

6. The memory device of claim 4, wherein the active tagging latch is configured to periodically reset in response to an output value of the refresh counter.

7. The memory device of claim 1, wherein the active tagging latch includes:

a demultiplexer configured to transmit an output signal from the row decoder to one of an active command path and a refresh command path in response to a command flag;

a flip flop connected to the demultiplexer, and configured to store the value of the active command path and to reset in response to a refresh reset signal; and a gate circuit configured to perform an AND operation on an output value of the flip flop and a signal value of the refresh command path and to output a word line flag.

8. The memory device of claim 7, wherein the refresh control circuit further includes:
a refresh counter configured to count up a count of a row address corresponding to a word line on which the first refresh operation is performed, and to output the refresh reset signal every predetermined period of time.

9. The memory device of claim 1, wherein the memory device is configured to perform a read or write operation on at least one cell connected to a word line on which the first refresh operation is skipped regardless of a refresh command execution time.

10. The memory device of claim 1, wherein the refresh control circuit further includes:
a target row refresh logic configured to perform, based on an access count within a period of the first refresh operation, a second refresh operation on a target row address.

11. A method of operating a memory device, the method comprising:
periodically receiving a refresh command from a host;
determining whether a target row address is activated during a predetermined period of time; and
skipping a refresh operation on a word line corresponding to the target row address when the target row address is activated, and transmitting, to the host, a refresh skip signal corresponding to the word line on which the refresh operation is skipped; or
performing, in response to the refresh command, a refresh operation on the word line corresponding to the target row address when the target row address is not activated.

12. The method of claim 11, further comprising:
storing, in an active tagging latch, a value indicating whether the word line corresponding to the target row address is activated within the predetermined period of time.

13. The method of claim 12, further comprising:
resetting the active tagging latch every predetermined period of time.

14. The method of claim 11, further comprising:
receiving, from the host, a read or write command for at least one memory cell connected to the skipped word line within the predetermined period of time.

15. The method of claim 11, further comprising:
storing an activated row address in a row active register in response to an active command requested from the host.

16. A memory system comprising:
a memory device; and
a controller configured to control the memory device,
wherein the memory device includes:
a cell array including a plurality of memory cells connected to a plurality of word lines and a plurality of bit lines; and
a refresh control circuit configured to perform a refresh operation on the plurality of memory cells of the cell array, wherein the refresh control circuit includes:
a refresh skip circuit including an active tagging latch and configured to periodically receive a first refresh command and to skip a first refresh operation depending on a value stored in the active tagging latch; and
a target row refresh logic configured to perform a second refresh operation based on a number of accesses to a target row in a predetermined period of time in response to a second refresh command, and
wherein the value stored in the active tagging latch indicates whether a corresponding word line is activated within the predetermined period of time.

17. The memory system of claim 16, wherein the controller is configured to receive, from the memory device, a refresh skip flag for a word line on which the first refresh operation is skipped through at least one data pin or at least one data mask pin.

18. The memory system of claim 17, wherein the controller is configured to transmit, to the memory device, a read command or a write command for at least one memory cell connected to the skipped word line depending on the refresh skip flag regardless of a refresh execution time.

19. The memory system of claim 16, wherein:
the first refresh command is an auto-refresh command, and
the second refresh command is a refresh management command.

20. The memory system of claim 16, wherein the active tagging latch is configured to reset every predetermined period of time.

* * * * *